UNITED STATES PATENT OFFICE.

GEORGE H. MOWE, OF WATERTOWN, NEW YORK.

COMPOSITION OF MATTER TO BE USED FOR A FOOD.

1,089,251.  Specification of Letters Patent.  Patented Mar. 3, 1914.

No Drawing.  Application filed June 6, 1913.  Serial No. 772,045.

*To all whom it may concern:*

Be it known that I, GEORGE H. MOWE, a citizen of the United States, residing at Watertown, in the county of Jefferson and State of New York, have invented a new and useful Composition of Matter to be Used for a Food, of which the following is a specification.

This invention relates to new and useful improvements in composition of food products and the object in view is to produce a composition having cereals, one of which is parched or roasted, and the other a meal especially adapted for strengthening and building up tissues of the body.

In the composition which I have produced, I utilize cornmeal and parched bran in equal parts, the meal being used in its natural state while the bran is parched or roasted over a quick fire until brown, after which the two ingredients are thoroughly mixed together.

In the preparation of the composition for breakfast food, they are mixed preferably with boiling salt water and cooked for a sufficient length of time to prepare the cereals as a proper food diet.

I have found that the cornmeal tends to strengthen and build up the tissue of the body, while the wheat bran serves as an efficient laxative, the preparation being wholesome, non-glutinous and healthful.

What I claim to be new is:—

A composition of food material comprising cornmeal and parched bran mixed together in equal quantities.

GEORGE H. MOWE.

Attest:
JOHN H. O'BRIEN,
LOUISE A. HENDERSON.